US006004121A

United States Patent [19]

Gupta

[11] Patent Number: 6,004,121

[45] Date of Patent: Dec. 21, 1999

[54] METHODS OF COLOR MARKING USING PITUITOUS COLOR COMPOSITIONS

[76] Inventor: Hemant K. Gupta, 27939 Oakmoor St., Canyon Country, Calif. 91351

[21] Appl. No.: 08/592,194

[22] Filed: Jan. 26, 1996

Related U.S. Application Data

[62] Division of application No. 08/205,904, Mar. 2, 1994, Pat. No. 5,514,415.

[51] Int. Cl.$^6$ .............. B29C 67/24

[52] U.S. Cl. .............. 425/87; 425/317; 425/472

[58] Field of Search .............. 425/87, 317, 472

[56] References Cited

U.S. PATENT DOCUMENTS

| | | | |
|---|---|---|---|
| 3,692,548 | 9/1972 | Packer . | |
| 3,957,432 | 5/1976 | Kuryla . | |
| 4,014,833 | 3/1977 | Story . | |
| 4,139,965 | 2/1979 | Curry et al. . | |
| 4,163,738 | 8/1979 | Corwin . | |
| 4,232,003 | 11/1980 | Posthuma et al. . | |
| 4,257,755 | 3/1981 | Lemelson | 425/444 |
| 4,578,131 | 3/1986 | Hawkins, Jr. | 156/62 |
| 4,584,042 | 4/1986 | Wandroik | 156/280 |
| 4,812,071 | 3/1989 | Batra . | |
| 4,859,242 | 8/1989 | Hughes et al. . | |
| 4,917,521 | 4/1990 | Lai . | |

*Primary Examiner*—James P. Mackey

[57] ABSTRACT

A system of marking substrate using pen devices containing pituitous colorants is described. Preferred applications for such marking devices are art and craft products made by children, students and novice or professional artists. The method of marking comprises dispensing a quantity of pituitous liquid color composition through an applicator device to a visible scene, pulling the dispensed color composition into one or more strings. The drawn string can be maneuvered to mark the substrate in a way so as to produce a variety of markings including art and craft works. The deposited color composition dries at ambient conditions resulting in permanent or semi permanent art works.

8 Claims, 8 Drawing Sheets

METHODS OF COLOR MARKING USING PITUITOUS COLOR COMPOSITIONS

This is a division of Ser. No. 08/205,904 filed on Mar. 2, 1994, now U.S. Pat. No. 5,514,415.

FIELD OF INVENTION

The invention relates to a novel system of marking that includes pituitous color compositions, applicator devices and methods of creating art works.

BACKGROUND OF THE INVENTION

Various color compositions have been used for art and craft applications for children and artists since ancient times. Among the well known of these colorants are water colors, glue colors, acrylic paints and fabric paints et cetera. Most of the color formulations and techniques to date have been standardized and widely used. The conventional materials lack versatility of application and can cause children and novices to lose interest. Curry et. al. in U.S. Pat. No. 4,139,965 describe a chemically reactive marker that introduced a surprising and exciting element in the making of the art work. Hawkins in U.S. Pat. No. 4,578,131 described a method of creating a three dimensional sculptured painting with enhanced three dimensional effects. In the U.S. Pat. No. 4,584,042, Wandroik describes an artistic method for creating an art form in the steps of permanently affixing a first substrate material to a second substrate material wherein the second substrate is rigid relative to the first substrate. Even though there is a diversity of techniques and methods described in the literature, there continues to be a need for colorants, marker devices and methods which produce novelty art and crafts through elements of surprise and fun. The present invention describes a novel system of marking visible surfaces using pituitous colorants which brings in an element of surprise and fun to the art of marking surfaces.

In general, stringy behaviour of a material system is associated with highly viscous fluids. It was noticed and found in experiments that addition of certain additives remarkably enhanced the elastic character of a number of common water-based colorants used in paint and coating of art and craft products such as the water colors, the acrylic colors or the polyvinyl acetate glue, water-based inks etc., while maintaining substantial fluidity. It was soon realized that such compositions are ideal for use in a variety of marking devices where the colorant can be easily dispensed at room temperature due to fluidity but at the same time stretched like a rubbery solid. The color compositions of the present invention exhibit this apparent contradiction leading to novelty and uniqueness of many pen type devices and methods of marking using such devices.

SUMMARY OF THE INVENTION

Briefly, an embodiment used to carry out the methods of the present invention includes a unit comprising a singular or plurality of storage and dispensing means such as resilient squeeze bottles or syringe pens or squeeze pens to be used to contain and dispense the contents. Contained in and preferably visible through each of the container units is a quantity of pituitous color composition. Each container has a different color of pituitous composition or may have multiple pituitous color compositions in one container which may be separated by partitions. The color composition is dispensed to a visible scene through a dispensing tip attached to the container unit used to store and dispense the colorant.

A method for creating an art and craft object using at least one pituitous color composition comprises steps of dispensing the colorant through a dispensing tip attached to a container used to store the colorant. After the initial application of the colorant to the visible scene, the color composition is stretched to draw one or more strings between visible scene and the dispensing tip. The drawn string is used to create special effects on the visible scene by collapsing or dragging it across the surface. The marking of said color composition is allowed to harden or dry at room temperature. Before the color composition dries out, a glitter material can be sprinkled to add brightness to the scene. The following are some of the unique advantages of the present invention:

1. It is unexpectedly pleasing and exciting.
2. It can be applied to a wide variety of colorants involving pigments and dyes.
3. It provides ease of drawing straight lines without using the the straight edge devices. Using the straight line elements, complex polygonal shapes can be drawn using dot to dot art. Curved shapes can also be drawn by maneuvering the drawn colorant string.
4. It can be applied to a variety of binder systems including acrylic paints, water dilutable polyvinyl acetate glues such as the Elmer's glue.
5. It enables effective markings using gliding techniques including bifurcation points.
6. It enables drawing patterns with special effects to be made in relatively short periods by using folding art.
7. It admits a versatility of operation. Devices described in the present invention have been used to fill areas with colors, special effect writing, calligraphic writing and drawing.

The present invention offers endless possibilities for simulating new fun activities for children, novice art lovers, common individuals and artists. It is found that the creativity and inventiveness of the user blossoms when the present invention is used. For young children, eye-hand co-ordination, sensory motor skills and color recognition, all precursors to reading, are readily experienced by using the present invention. The invention encourages the child to experiment with colors and designs in a way that has never been possible before. The invention makes it possible for teachers to teach geometric objects such as lines, triangles, squares and 3-d perspectives et cetera. Since the pituitous color compositions are water soluble, they can be easily cleaned from clothes, furniture and hands. Completely non toxic color composition can be made. Such compositions will not harm children through inadvertent or accidental misuse.

DETAILED DESCRIPTION

Devices

Figure 1:
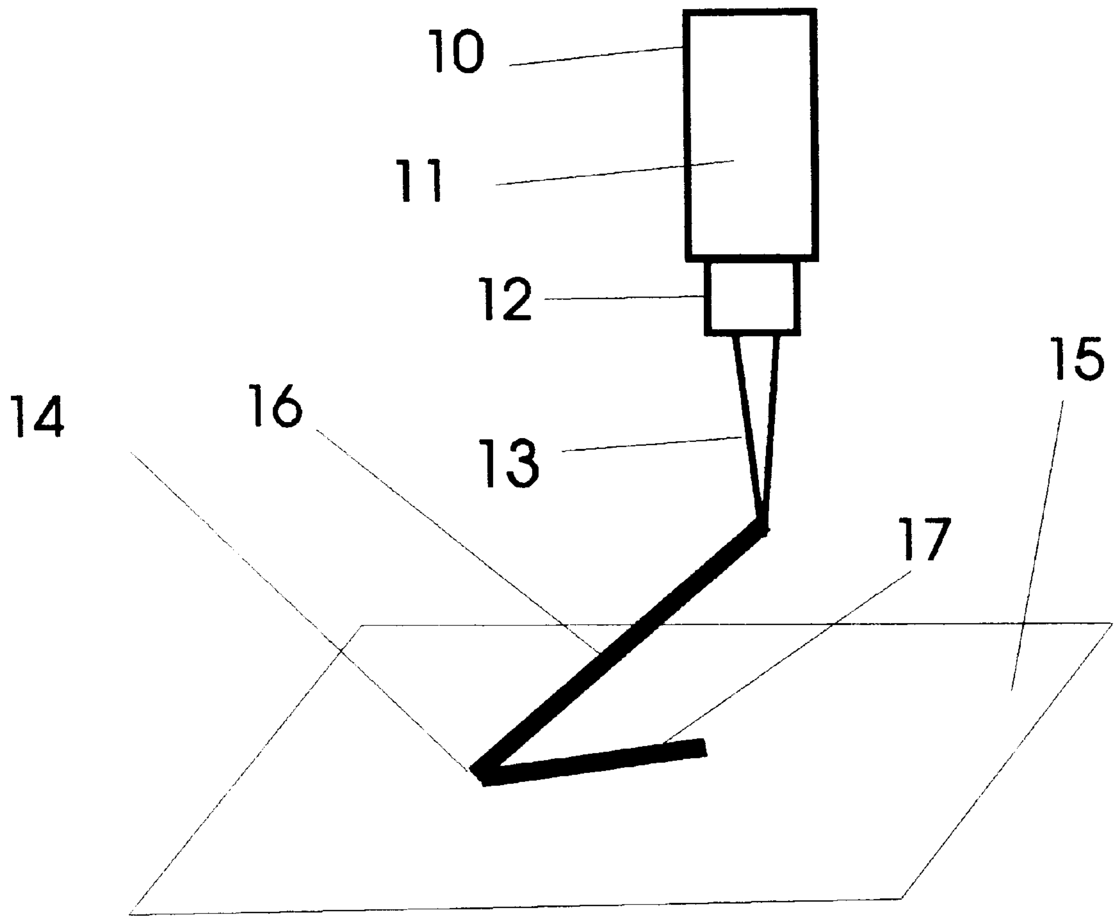
FIG. 1 depicts a squeeze bottle pen device for storage and dispensing of pituitous color composition and shows formation of the string element means.

FIG. 1 shows a squeeze bottle pen device found suitable for storage and dispensing various pituitous color compositions. The figure shows unit 10, a resilient squeeze barrel which is formed of a preferably transparent material. In general, the device unit could be a singular or plurality of storage and dispensing means such as resilient squeeze bottles or syringe pen, or squeeze barrel pen used to contain and dispense the contents. Contained in and preferably visible through the sides of each bottle is a quantity of preferably non toxic, water dilutable color composition 11. In general, there may be a multiple of pituitous color compositions in one container which may be separated by partitions. The container 10 has a top 12 with a tapered tube dispenser 13 which allows the colored composition 11 to be dispensed on the visible scene 15. In a preferred embodiment, the colorant is dispensed on the visible scene 15 at an initial point of contact 14. Using the tip of the dispenser 13, the colorant deposited at the initial point of contact 14, is pulled in the air to draw a string element means 16 comprising a column of the pituitous color composition 11. The string element means has a finite life i.e. a drawn string would eventually break. Before the elongated string element means 16 breaks, it can be dragged or collapsed on the visible surface 15 to draw marking lines 17.

Figure 2:
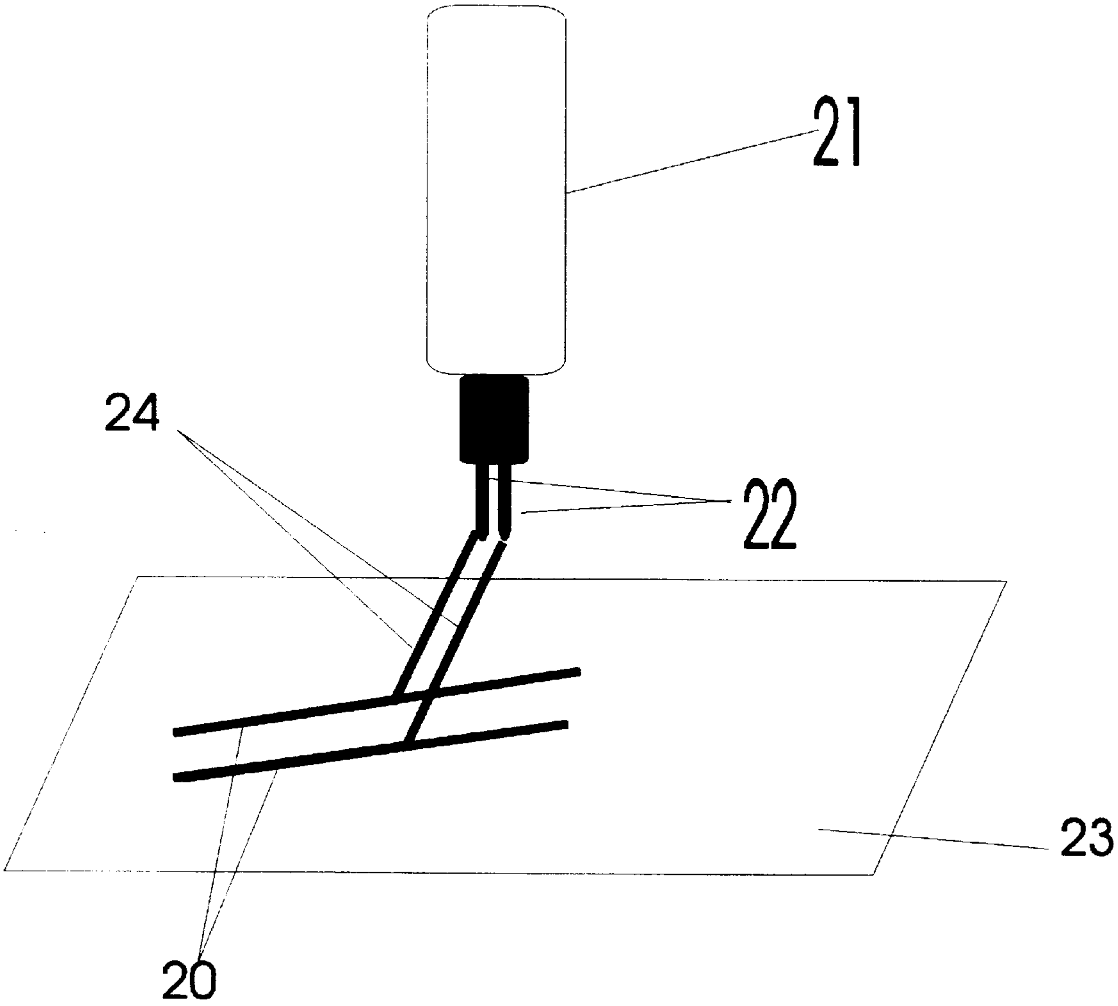
FIG. 2 depicts a dispensing tip capable of marking two parallel lines.

The color composition could be dispensed such that thick lines, multiple parallel lines or other desired shapes can be drawn by simply altering the dimensions of the orifice or the design of the dispenser tip. As shown in FIG. 2, the dispensing tip 22 enables two points of contact simultaneously on the visible surface 23, thus allowing two string element means to be pulled resulting in two parallel lines 20 on the visible surface 23.

Figure 3:
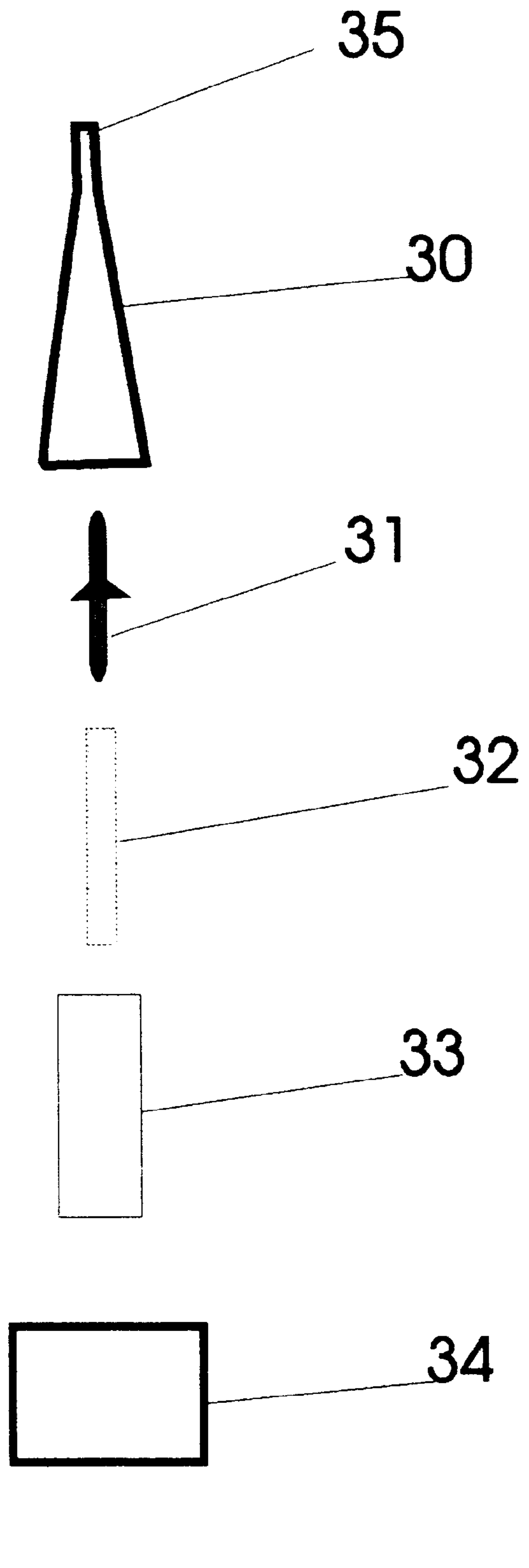
FIG. 3 depicts a dispensing tip with retractable stylus assembly to eliminate bubble formation during the dispensing of the pituitous fluids.
Figure 4:
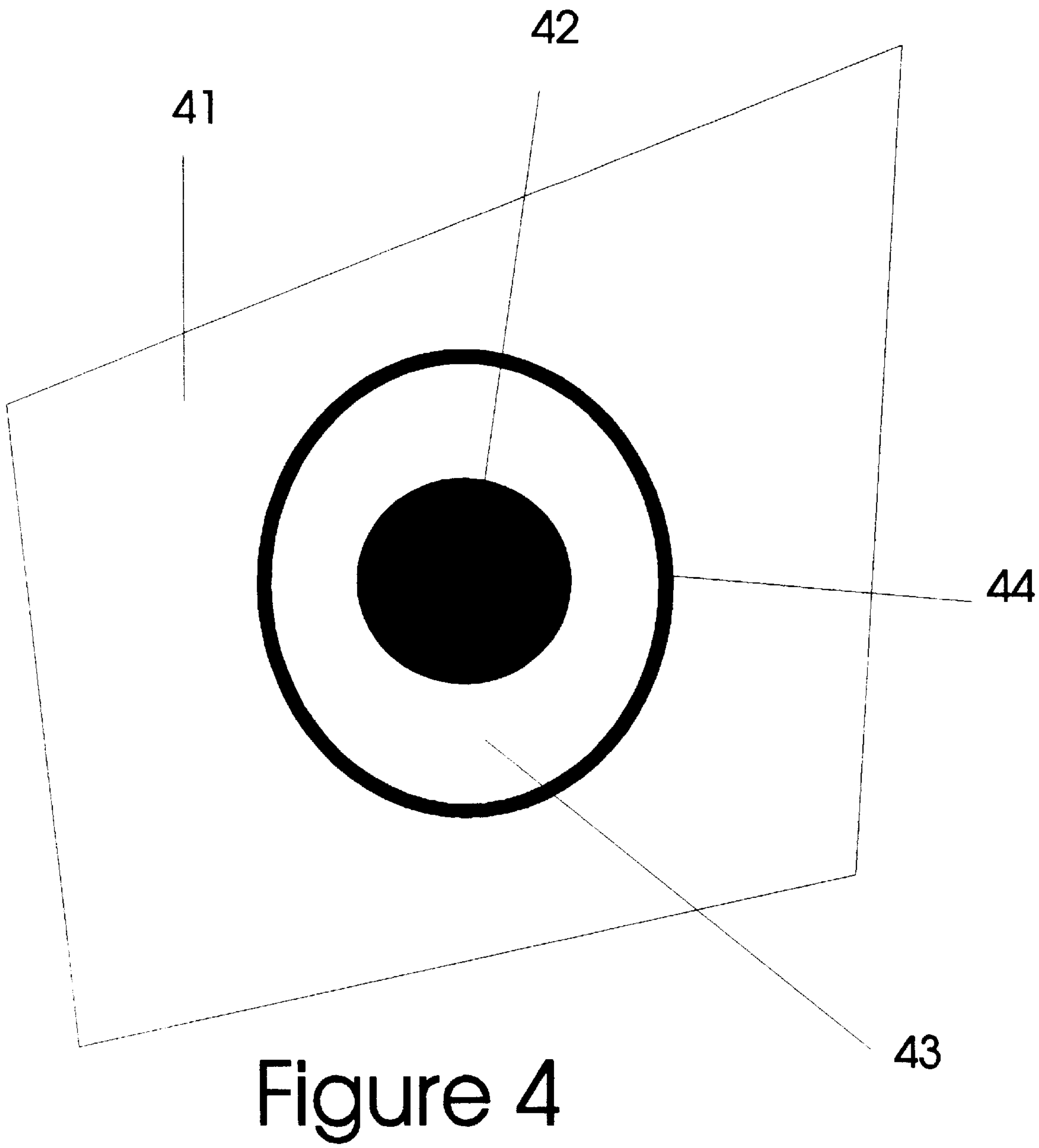
FIG. 4 depicts the discharge orifice area for the retractable stylus assembly.
Figure 5:
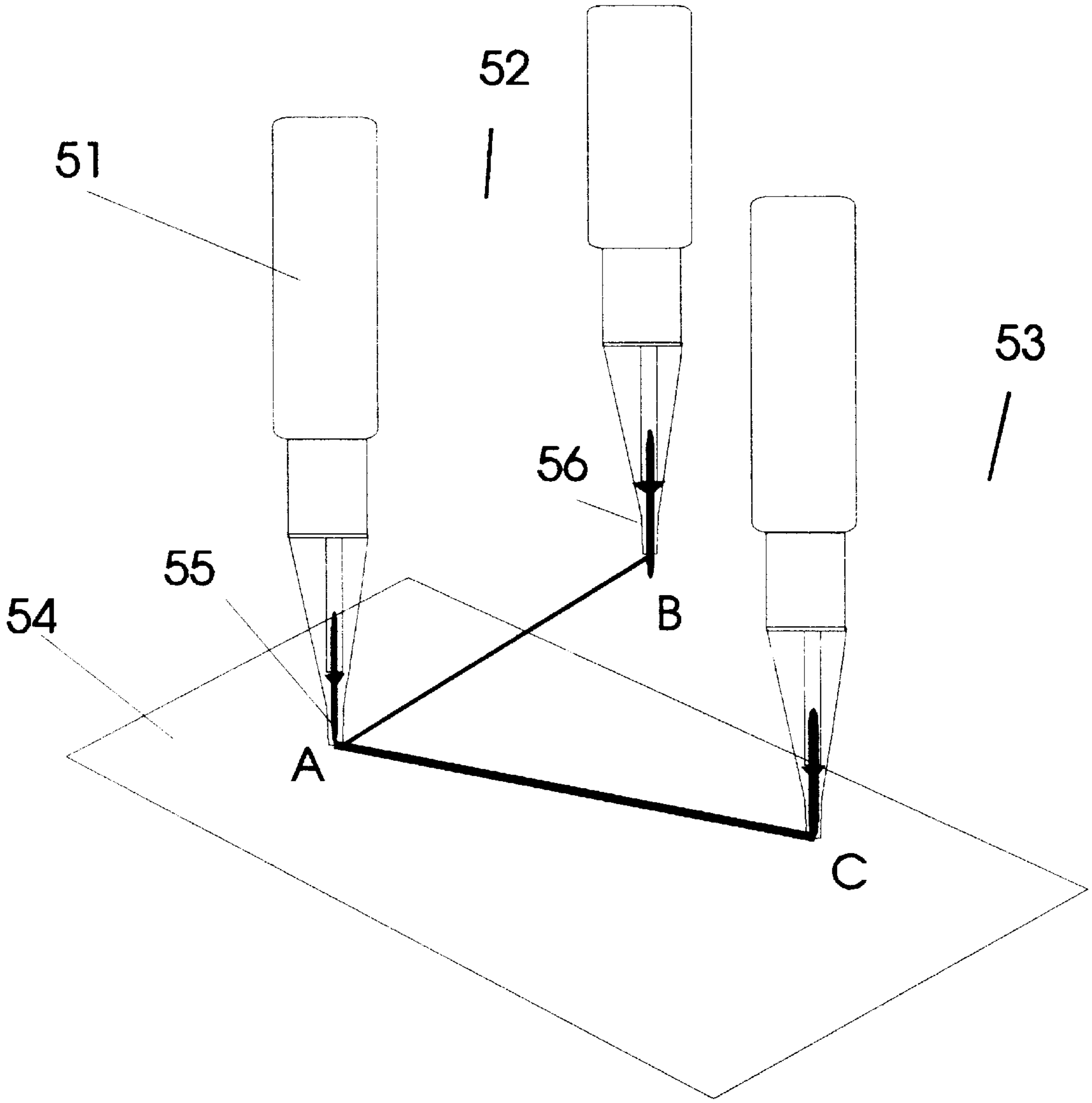
FIG. 5 depicts method of marking using a dispensing tip with retractable stylus assembly.

The dispensing tips, particularly the ones with very small orifice, form occasional bubbles creating abnormalities in the marking process. A dispensing tip 30 shown in FIG. 3 minimizes or eliminates such defects by the introduction of a solid stylus assembly 31 into the discharge orifice 35 which breaks the formation of bubbles. The stylus is movably secured in a holder body 33 in such a manner that a writing pressure enables the solid stylus 31 to move backwards against the resilient force of the seat 32 to form an ink-feed space 43 as shown in FIG. 4 between the head portion 42 (FIG. 4) and the holder body 40 (FIG. 4). As shown in FIG. 5, in order to use the marking device, the user manually squeezes the barrel 51 while pressing the tip of stylus 55 against the visible scene 54, thereby, causing fluid to pass through the annulus 43 (FIG. 4) and onto the surface 54 (FIG. 5). As illustrated in FIG. 5, once the desired amount of the color composition is dispensed on the visible scene 54, the stylus assembly 55 is pulled away from the surface 54 in the air space. As the pressure is removed from the tip of the stylus assembly 55, the ink feed space 56 closes preventing discharge of any further pituitous color composition. At the same time, the color composition due to its special pituitous rheology forms a string element means AB between the tip of the stylus 56 and the visible surface 54. The string element means AB, thus formed (position 52) can be maneuvered (position 53) to draw line AC line on the visible scene 54. One may continue the process until the string element means breaks. The process then can be resumed any number of times by dispensing more colorant on the scene followed by drawing and maneuvering the new string element means. The stylus assembly 55 further introduces an effective metering of the discharged color composition providing control over the quantity of dispensed fluid. The nib holder body 40 (FIG. 4) can be of a variety of shapes and sizes according to the impressions desired on the visible scene.

Pituitous Color Composition

The color composition is preferably a pourable liquid at room temperature which stays liquid if stored propererly at room temperature in a container. It, however, hardens at room temperature once applied to a substrate and exposed to ambient for adequate period. In the dried state, the color is substantially the same as in the liquid.

The color composition comprises a paint vehicle and a suspended pigment or dye or both in said vehicle, and an additive means admixed with the vehicle to impart stringy rheology to the color composition. The paint vehicle may also contain a binder, a thickener or both suspended or dissolved in a single or mixed solvents. Preferred solvents are non toxic such as water or isopropyl alcohol. Preferred paint vehicles may be selected from a group of acrylic emulsion paints, polyvinyl emulsion paints, artist's or children's water colors, water dilutable inks and water dilutable color dispersions. The type of binder used defines the type of paint medium. Tempera, for example, is a waterborne paint where egg based proteins are typically used as binders. Ink is a waterborne medium for pigments or dyes with shellac used as a common binder. Acrylics and vinyls are waterborne paints that have polymer binders. Water colors are waterborne paints with a gum binder. The most frequently employed binder is gum acacia or arabic. Others such as tragacanth gum, and plant mucilages have also been used.

Colorants which may be employed are standard F.D. & C, and non F.D. & C. colors, both water soluble and insoluble. Preferably, the colorant is a non-toxic water dilutable dye or a pigment or a mix of the two in form of color dispersions or latex paints or coatings. The non toxic characteristics of the color composition is important for applications involving children. With appropriate selection of pigments and dyes, which are well known to the individual familiar with the art, the product will not harm children who may intentionally or inadvertently place the color composition in their mouth. The incorporation of other pigments is not excluded. However, such compositions would be used by adults or professional artists with proper care.

An additive means that imparts stringy or pituitous characteristics to said paint vehicle can be selected from certain categories of water soluble polymers. Preferably these polymers are high molecular weight polyacrylamide or high molecular weight polyethylene oxides. A number of grades of these polymers are commercially available through many suppliers. Union Carbide markets a line of polyethylene oxide polymers viz. WSR-301, WSR-309: many of these polymers are capable of producing stringy rheology. In general, the higher the molecular weight of these polymers, the greater will be the tendency to produce pituitous compositions in water with smaller concentrations. Literature search has revealed that PEO as a pituity agent has been used in the following three applications.

First are the inks used in oscillographic recorder devices. An oscillographic pen comprising a metallic capillary tube connected to a supply of ink, is biased against a paper recording medium which is moved slowly and continuously under the pen tip. As the pen terminates its excursion in one direction towards the side of the recording paper tip, and reverses direction to move in the opposite direction, the ink contained therein has tendency to continue in the first direction due to the force of inertia on the ink resulting into splattering. Additionally, at high speeds the pen has tendency to skip markings. For inks used in oscillographic pen recorder, pituity of the colorant provides two benefits: one, reduces skipping and two, reduces splattering problems (see U.S. Pat. Nos. 4,163,738, 3,692,548, 3,477,862).

The second application involves the color pastes used in Flexographic printing. Augustus L. Story in U.S. Pat. No. 4,014,833 describes cases of flexographic inks and the recorder inks where transfer char acteristics are improved by introducing pituitous character to the ink. Flexographic printing process is a form of relief printing, in which an impression is taken from the raised part of a printing surface. The printing machines are essentially high speed web or sheet fed rotary presses, which print with liquid inks from curved plates, usually made out of rubber or other plastic materials, attached to a cylinder. The printing process involves the distribution of ink in a uniform film, the provision of a substrate having a uniform surface, and transfer of ink to the substrate. The final force on the ink film is heavy pressure against a porous surface followed by a tension sufficient to split the film.

The third application involves styling and decoration of carpets through dripping technique. Williams Kuryla in U.S. Pat. No. 3,957,432 described the use of high molecular weight polyethylene oxide as a preferred thickener to color compositions used for carpet designs. He describes a dropping technique where the colorant was dropped on a moving carpet through various sizes and shapes of orifice to generate various designs. In contrast with the usual thickeners such as starch or hydroxyethyl cellulose, the main advantage of using high molecular weight PEO was cited as controlling the bleeding of dye on the fabric.

The color pastes based on PEO, however, are susceptible to severe auto-oxidative degradation and loss of viscosity and pituity in aqueous solution. Such consideration is not significant if the paste can be made fresh just before the application. This is, however, a critical consideration for marking devices which could be on shelf for many months to years. The degradation mechanism involves the formation of hydroperoxides that decompose and cause cleavage of the polymer chain. The rate of degradation is increased by heat, UV exposer, strong acids or certain transition metal ions, particularly $Fe^{3+}$, $Cr^{3+}$, $Ni^{2+}$. Ethyl, allyl, or propyl alcohols, ethylene glycol, $Mn^{2+}$, or Irgonox 1520 (antioxidant manufactured and marketed by Ciba Giegy) are known to somewhat stabilize the aqueous polyethylene oxide solutions.

Polyacrylamide linear polymers or electrolytic copolymers also show strong tendency to produce pituitous compositions and in certain instances may show better stability during room temperature storage as pointed out in U.S. Pat. No. 4,163,738. A large number of commercially available polyacrylamide may be used to impart pituity to color compositions. For example, polyacrylamide polymers commercially available through Calogen Corporation under the trade names E-933, E-934 and E-936, American Cyanamid's Superfloc 1226, Magnifloc-866A, Magnifloc-1885A and Magnifloc-1883A and Stockhausen's Praestol 2540 and Praestol 2273Tr are some of the polymer products which can impart various degrees of pituity in water or mixed solvents depending on the specific application needs. It will be clear to those skilled in the art that many combinations of additives may be used.

Preferably the selected additive, when dissolved, is a non toxic, water soluble polymer which has an extraordinary capability of forming strings from highly dilute to concentrated solutions which are stable at room temperature. Pituity of the colored solutions was measured by dropping a fixed quantity of the solution from a microsyringe and by measuring the time required for the string to break. A minimum of 1 second of pituity is estimated to provide enough time to manipulate the string element means. For compositions with longer pituity, more time is available for manipulation. However, compositions with excessive pituity in certain applications may pose difficulties in terms of disengaging the string element means from the dispensing tip. A typical pituity for various color compositions was measured to be about 3 to 40 seconds depending on the application.

A preferred way of making the pituitous color composition is to make a premix of the water soluble polymer additives. In general, much care is needed in making premixes of these polymers since pituity characteristics of the premix are severely affected by mechanical degradation during mixing. The degradation is particularly prominent if high shear mixing is used. A number of methods recommended by various manufacturers were found acceptable. A preferred way to prepare a premix is to form a dispersion of the pituitous additive means in a nonsolvent such as isopropyl alcohol. Once a dispersion is made, water can be added with slow mixing.

A preferred ratio of the polymer in the premix is from 2 to 50 percent by weight. A preferred ratio of the premix in the overall paint composition is from 0.05 to 100 percent by weight depending on the final application and the specific color system. Since the polymers used to impart pituity are good flocculants as well, care must be taken that dye stuff is completely dissolved before adding to the polymer solution. In case of pigments and emulsions, stabilized dispersions may be necessary to avoid settling.

Methods of Operation

All marking implements require a mechanism to be provided to the user to initiate and stop the marking process. In an ordinary pen device, the marking is initiated as the tip or nib assembly is pushed in to establish a contact with the visible scene. The marking continues as long as the nib assembly is in contact with the visible scene. The marking process is terminated as soon as the nib assembly is pulled away from the visible scene by the user. Use of a marking element comprising a string of pituitous color compositions in marking pen devices leads to noval and unique methods of marking using these devices with remarkably different mechanisms of initiating, continuing and terminating the marking process. In order to clearly define the scope of the present invention, we would use the term PUSH vectors and PULL vectors to describe these mechanisms. The term PUSH vectors refers to forces applied by the user to the marking implement where the resolved vector components of the force in the vertical direction points INTO the plane normal to the visible scene at the point of first contact. In contrast, the term PULL vectors refers to forces applied by the user to the marking implement wherein the resolved vector component of the force in the vertical direction, points AWAY FROM the plane normal to the visible scene at the point of the first contact.

Figure 6:
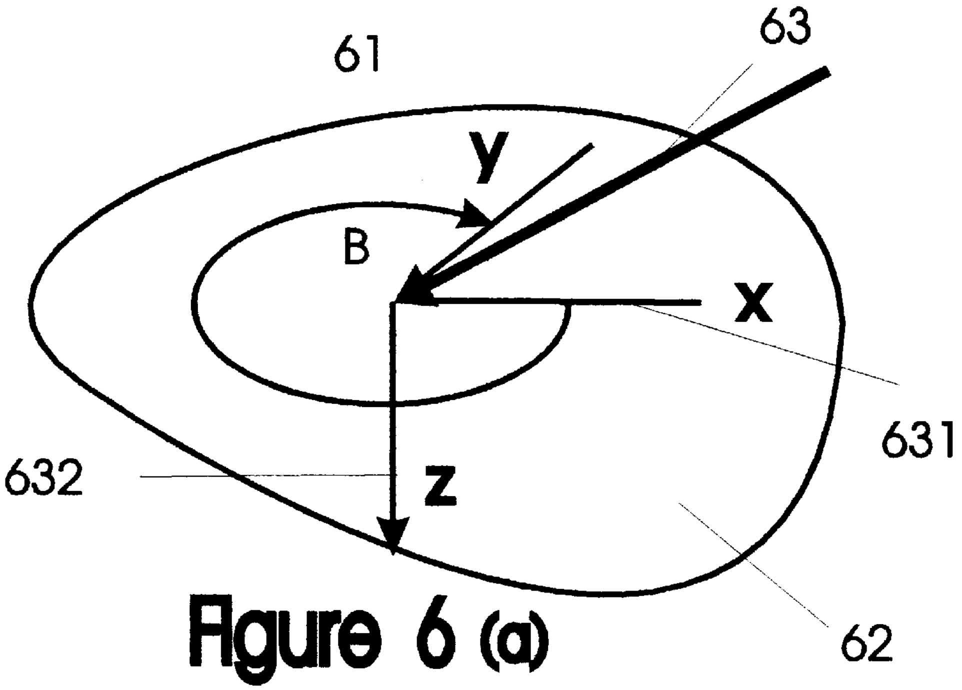
FIG. 6 depicts differences between the use of PUSH vectors and the PULL vectors in marking techniques.
Figure 6:
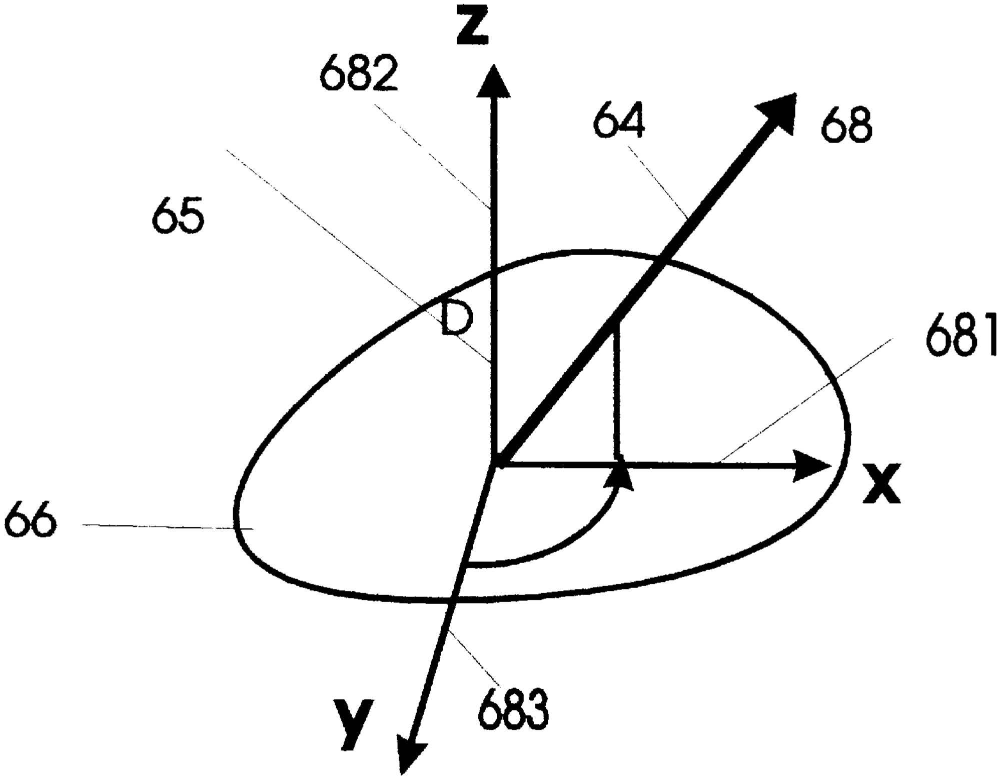

For clarity, a generalized marking process using the PUSH vectors is depicted in FIG. 6(*a*). The figure shows the nib assembly 61 pushing against the visible surface 62 at point B. For any generalized process, the push force 63 directed into the surface can be resolved into two vectors which are parallel 631 and perpendicular 632 to the plane XY which is normal to the surface of marking 62 at the point of contact B. The perpendicular force vector 632 pointing into the visible scene 62 forces the colorant to go inside the surface 62 thus initiating or continuing the marking process, whereas the parallel force vector 631 is responsible for spreading the colorant at the contact of the nib assembly 61 to the visible scene in a desired direction.

A generalized process of using the PULL vectors is shown in FIG. 6(*b*). A small quantity of the pituitous color composition 65 is first deposited to a point D on the visible scene 66 using a dispensing means. A string is then pulled in the air using a pull force 68 resulting in a string element means 64. The generalized pull force 68, can be visualized to have been resolved into two vector components. One, the component 681 parallel to the plane XY which is normal to the surface 66 at D, the point of contact. Two, the component 682 perpendicular to the plane XY which is normal to the surface 66 pointing away from the visible scene 66 at the point of contact D.

The string element means 64 comprising a column of the colorant marks the substrate by dragging or collapsing on the visible scene along a desired trajectory. The marking process is terminated as the string element means disengages from the dispensing tip due to the finite pituity of the colorant. If the colorant 65 is not pituitous in character then removing the nib assembly from the visible scene 66 by using the PULL vectors will instantaneously terminate the marking process.

Many conventional methods of marking utilize PUSH vectors to initiate and continue the marking process and PULL vectors to stop the process. These methods are referred here as PUSH vector techniques. Typical examples include the pen devices with internal or external inkwell (e.g. fountain pen, ball point pen, roller tip pen and fibertip marker pens, paint brush, bamboo pen etc.). The marking process is initiated as the tip or nib assembly is pushed against the visible scene to establish a contact. The marking continues as long as the nib assembly is in contact with the visible scene. The marking process is terminated as soon as the nib assembly is pulled away from the visible scene by using the PULL vectors.

Another example may involve solid colorants such as waxcolors or pencils etcetera. These utilize a solid applicator made of the colorant itself. Here again, the marking process is initiated and terminated by a sequence of PUSH & PULL vectors. The marking process progresses as the colorant is continually pushed and transferred to the surface through attrition. The marking process is terminated by pulling the marking implements away from the visible scene.

In contrast to PUSH vector techniques of marking, the present invention describes methods of marking where PULL vectors are used as the main marking steps. These techniques are generally referred to as PULL vector techniques. Under the influence of a pull force the string element means 64, in general, will either stretch or break like an elastic solid or may collapse on the visible scene in the direction of the resolved horizontal vector of the pull force. A push force on the string element means 64, causes retraction of the string element means similar to an elastic solid. However, unlike the pull vector component it results in no motion.

Figure 7:
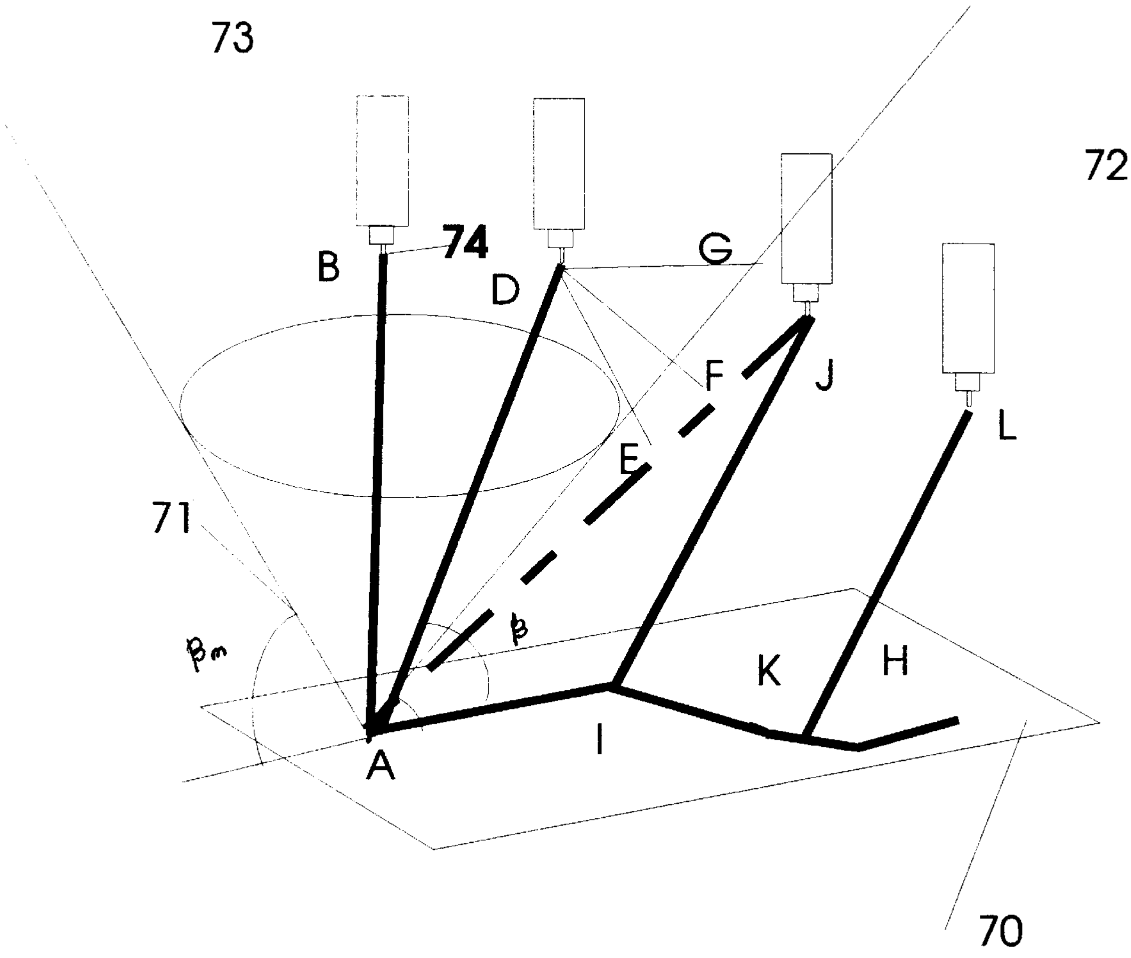
FIG. 7 depicts the method of forming and marking using the string element means.

Various steps essential to marking the visible surface by using the string element means are illustrated graphically in FIG. 7. The point A represents the first application of the pituitous color composition on the visible scene 70. A string element means (AB as shown) is pulled in the air such that point of contact B is on a solid applicator device 74. The string element means can be maneuvered to collapse on the visible scene to effect various markings on the visible surface. One of the most significant variables to control maneuvering the string element means is the angle β as shown in FIG. 7. In general, it is an angle formed between the string element means (AD as shown) and the surface plane normal to the visible scene at the point of contact (A as shown). The string element means shows tendency to collapse on the visible scene which depends on the magnitude of β. The higher the absolute magnitude of the angle β (i.e approaching 90°) the lower is the tendency to collapse. In the position where the string element means (AB as shown) is vertical to the marking surface i.e β=90°, marking lines on the surface are not possible since the string element means will not collapse on to the surface. If the string element means is kept in this position for times greater than the pituity of the colorant, the string will break leaving only the initial point of marking A on the surface. The string element means (in position AD as shown) remains incapable of marking until the angle β is reduced below a critical value βm, the magnitude of which is a strong function of the chemical and physical nature of the string element and the surface characteristics of the visible surface.

The angle βm is shown in FIG. 7. It can be visualized so as to mark the boundary of a 3-d surface of a cone 71. The inside zone 73 of the cone represents an area in 3-d space where the string element means AD would not show the tendency to collapse. To initiate the collapse, the string element means must be maneuvered to move out side of zone 73. A variety of trajectories starting from the position AD viz. DE, DF, DG will lead to the condition of collapse. Each of these lead to lowering of the angle β by altering the position D of the dispensing tip to which the string element means is attached to reduce it below βm. As the angle β formed by the string element (position AJ as shown) is reduced below the characteristic angle βm, the string element means AJ shows a tendency to partially collapse on the surface. This results into marking AI and the point I becomes the new starting point for the string element means IJ. The kinetics of the process of collapsing, in general, are such that the collapsed string line element on the visible scene tends to follow a straight line path which is fascinating and unique among the marking elements. In comparison to conventional marking elements, the line drawn is straight without the use of a straight edge.

The process of partial collapse of the string element means, in general, can be controlled in a manner that it allows simultaneous collapsing and stretching of the string element means thus enabling one to draw curved lines and a wide variety of complex figures. As further illustrated in FIG. 7, the partial collapse of the string element means IJ is initiated by lowering the dispensing tip J towards the visible scene 70. As illustrated, the partially collapsed string element means marks the curved line segment IK which is a function of the trajectory defined by the dispensing tip J as it moves from the point J to the point L. The point K becomes the new starting point for the string element means KL. The string element means KL can be further continuously stretched and/or moved to continue partial collapse of the string element means until the string will break to interrupt the marking. The process can be resumed by dispensing more colorant on the visible scene and pulling a new string element means.

Figure 8:
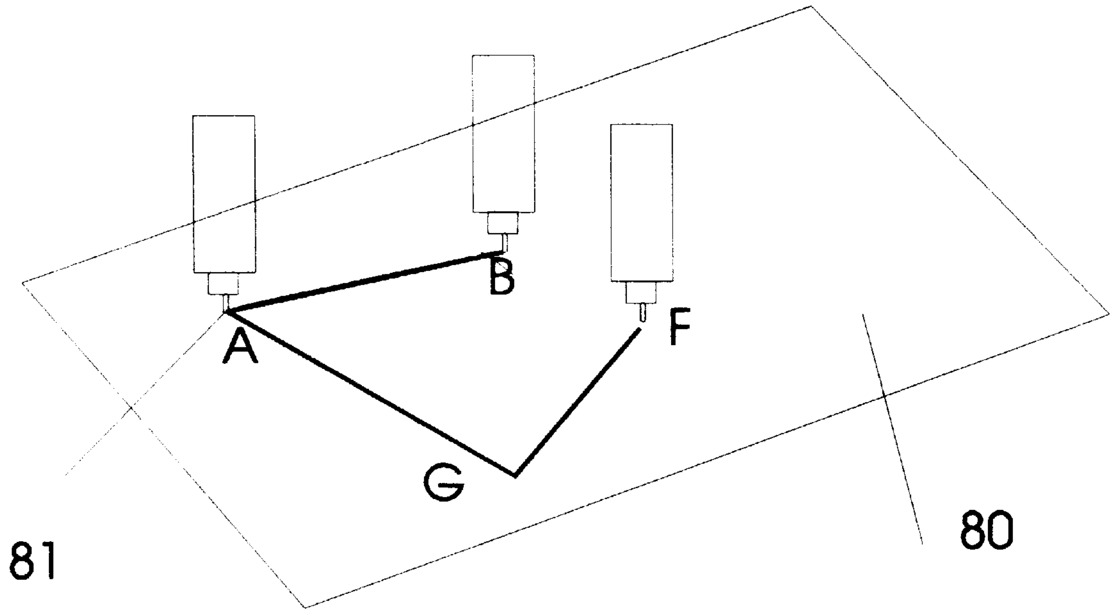
FIG. 8 depicts drawing of geometrical shapes involving connecting dots indicating the natural tendency of the color string element means to mark straight lines in between the dots.

The marking process using the string element means can simulate many features of Bezier mode of connect-the-dots method primarily used by computer graphics software programs such as paint brush or Corel Draw. As shown in FIG. 8, this method of marking, according to a preferred embodiment of the current invention, simply involves bringing the dispensing tip 81 to a selected point A on the visible scene 80, dispensing a small amount of pituitous composition, lifting the dispensing tip 81 into the air and moving it to the point B on the visible surface 80. A small amount of pituitous colorant is dispensed at point B and the tip 81 can be lifted and moved from point to point to continue the process. As the dispensing tip is lifted in the air, the pituitous colorant is stretched to form the string element means which collapses immediately on the visible scene 80 to mark AB. on collapsing to the visible scene 80, the string element AB adheres to the surface and dries under ambient conditions. Remarkably, the collapsed string element means connects the points A and B by a fascinating straight line joining the two points.

This unique way of applying a color composition was found unexpectedly pleasing and exciting. Due to the characteristics of the string, colored and beautiful lines are drawn in an easy fashion. Drawing geometrical shapes involving three or more dots such as in a triangle, a square, a rectangle etc. can be done in a similar fashion. The method can be extended to draw any figure using dots and connecting strings similar to what is found in children's connecting dot art. This novel way of making dot art is easy and exciting not only for children but for adults as well. In some instances, depending on the nature of the surface and the colorant that comprises the string element means, the collapsed string element is not able to maintain its straight line character. The markings in these instances may consist of a string of small round droplets or series of irregular shapes which may or may not be connected by a straight line. These special effects can further add to the novelty, diversity and excitement of producing various art and craft markings.

The methods of marking using string element means further provide a unique ability to trace a wet curve. This, in contrast to conventional writing means, can be done with utmost perfection and little effort. Due to the low coefficient of friction of the wet surface, the string element means prefers and glides over an existing wet marking. This is an effective tool in terminating the marking process where the user can simply glide the string element means over the existing marking and reinforce it until the string breaks. Creating bifurcation points, in contrast to the conventional devices, can be accomplished with unprecedented perfection and little effort.

It will be clear to those skilled in the art that there are many other methods of creating art and craft objects using pituitous color compositions particularly in the methods where PULL vector techniques are combined with a variety of conventional methods of marking. Many marking devices based on the PULL vector techniques may also be used to dispense the colorant using the PUSH vector techniques. This is possible because the pituitous colorant is found to reduce the friction between the tip of the dispensing device and the visible scene (U.S. Pat. No. 4,163,738). Devices described in the present invention have been used to fill areas with colors, special effect writings, calligraphic writings and drawings.

Many conventional methods of producing art and craft objects such as finger painting or folding etc. can be adapted for pituitous color compositions. Due to the tendency of the colorant to form strings, novel effects are often observed with these techniques.

This is illustrated in the case where children's art objects are created by following traditional folding methods. These methods involve steps of applying said color composition to a visible scene comprising a flexible material in a predetermined fashion by using a squeezing means, and folding and unfolding the said surface about a predetermined plane to make mirror impressions on the visible scene. The two mirror impressions would be formed as with an ordinary paint. However, due to the stringy rheology, some of the points would be connected by lines resulting in special pleasing effects. The advantage of such a technique is the short time it takes to complete a fascinating visible art work. This can be important for applications where the attention span of the artist is generally short e.g., in case of children. This technique can be further explored if an initial predetermined shape is carefully selected. For example, the mirror image of a closed predetermined figure with dots at the corners can be made across a selected fold plane. The strings are drawn connecting the dots in the original and the mirror impression thereby giving the art work a resemblance of a 3-D perspective drawing.

The present invention offers endless possibilities for simulating new fun activities for children, art lovers, common individuals and artists. The invention encourages a child to experiment with colors and designs in a way never been possible before. The invention may involve a wide spectrum of applications ranging from children's touch paintings to drawing of variety of chemistry structures, engineering flow charts, architectural drawings, business graphics such as bar charts and xy charts, commercial arts such as decoration of T-shirts, tennis shoes and pictures, etcetera.

The following examples are illustrative of the invention, but should not be construed as limiting to appended claims.

EXAMPLES 1-2 (Premixes)

Table 1 shows composition of the premixes prepared by dissolving selected additives to impart pituitous characteristics. Two premixes (P1 & P3) were made by dissolving in the solvent medium, a selected grade of polyethylene oxide with the trade name Ultrafloc Polymer 309 and another selected grade of polyacrylamide with trade name E-936 respectively. These polymers were dispersed in a small quantity of anhydrous isopropyl alcohol prior to the addition of water. The overall weight percent of the polymer was about 1%. The amount of IPA in the mix P1 was about 16% by weight and 5% by weight in the mix P3. Water was added slowly to the polymer dispersions being strirred at low RPMS. Once all the water was added, both the mixes were left at room temperature for 17 days with mild hand stirring every day at an interval of 24 hours. Both the premixes showed sensitivity to high shear mixing. Exposure to prolonged high shear mixing resulted in either a considerable or total loss of pituity of the premixes.

TABLE 1

Compositions of Premixes

| PREMIX I.D. | Water | IPA/WSR-309 | IPA/E-936 |
|---|---|---|---|
| P1 | 83 | 16:1 | |
| P3 | 94 | | 5:1 |

TABLE 2

Description of color symbols

| Color code | Description |
|---|---|
| C3 | BASONYL RED 481 |
| C4 | LUCONYL BLUE 7080 |
| C10 | UNISPERSE YELLOW BRM-PIG-895591 |
| C12 | UNISPERSE BLUE G-905393 |
| C14 | DUNCAN DECORATOR ACRYLIC OPAQUE DIMENSIONAL WRITER CHRISTMAS GREEN |
| C15 | DUNCAN DECORATOR ACRYLIC OPAQUE DIMENSIONAL WRITER ROYAL BLUE |
| C16 | ELMER'S GLU-COLOR ORANGE |
| C17 | ELMER'S GLU-COLOR FLUORESCENT YELLOW |
| C18 | TULIP SLICK FABRIC PAINT BLUE |

EXAMPLES 3-4

The premix P3 described above in example 2 was used. Two colorants C3 and C4 as described in table 2 were combined with P3 in the proportions indicated in table 3. The C3 colorant used is a water soluble dye obtained from BASF which is sold under the trade name of Basonyl 481 red #3. The colorant C4 is a water based pigment dispersion marketed by BASF under the trade name Luconyl Blue 7080. The formulations FOR004 and FOR010 were prepared by mixing the dye stuff (C3) and the pigment dispersion (C4) respectively with the premix (P3) in very low speed lab mixer. These two mixes were kept for 6 hours before being filled in squeeze pen-type dispensing devices. Both the compositions showed stringy characteristics suitable for drawing various designs as per methods described.

TABLE 3

Pituitous ink compositions suitable for pen devices.

| FOR I.D | P1 | P3 | C3 | C4 |
|---|---|---|---|---|
| FOR004 | | 100 | 1.2 | |
| FOR0010 | | 100 | | 1.25 |

Both compositions viz. FOR004 and FOR0010 were filled in holder bodies of two separate pen devices. Each pen device was equipped with a retractable dispensing tip similar to the one described in FIG. 3. These pen devices filled with correction fluids were marketed by Pentel of America, Torrance, Calif. as "fine point CORRECTION PEN". The correction fluid was removed and the pen body was thoroughly cleaned using mineral spirit. This was followed by a thorough washing step using soap and water followed by another step of rinsing with distilled water. The cleaned empty pen body was thoroughly dried under ambient conditions. The holder bodies of the two pens were filled with pituitous ink compositions described above and subsequently fitted with the stylus assembly.

The marking was initiated by pressing the tip of the stylus assembly against a paper surface with a glossy finish (Lebelon Plotter paper with super smooth coating). The ink was released from the ink feed orifice on to the visible scene. The pen device was then lifted up in the air and a string element means was formed. The string element means was maneuvered to deposit the string element on the paper surface to effect various markings using the PULL vector techniques as described earlier. This mode of operation was fascinating; it produced straight lines with remarkable ease without the help of any straight edge device, thereby simplifying the process and saving considerable time.

EXAMPLES 5-6

The premix P3 of examples 1-2 was used. The colorants used were commercially available aqueous pigment dispersions such as UNISPERSE YELLOW BRM-PIG-895591 and UNISPERSE BLUE G-905393 obtained from Ciba Geigy. The color dispersions were mixed in the weight ratios shown in table 4. Each of the mixes was agitated in a slow speed lab mixer for 5 minutes and subsequently filled in a squeeze bottle with a tapered dispensing top as shown in FIG. 1. The compositions FOR012 and FOR016 showed remarkable difference in contrast to the original colorants C10 and C12 respectively. The original compositions C10 and C12 were not pituitous and exhibited no abilities to form string element means. Both compositions FOR012 and FOR016 were pituitous and exhibited the ability to draw string element means and to create exciting designs on various substrates using PULL vector techniques. Streight line elements were easily drawn using these water colors compositions on paper surface with a glossy finish (Lebelon Plotter paper with super smooth coating). This was in contrast with the original compositions where drawing straight lines was not found to be an easy process and depended heavily on the skill of the operator. Once applied, both the pituitous paint compositions were easily spread by using either a normal brush device or the tip of the squeeze bottle.

TABLE 4

Pituitous water color compositions

| FOR I.D | P1 | P3 | C10 | C12 |
|---|---|---|---|---|
| FOR0012 | | 44.4 | | 53.7 |
| FOR0016 | | 42.5 | 56.7 | |

EXAMPLES 7-10

The premix P1 of examples 1-2 was used. The colorants used were commercially available water dilutable polymeric binder colors such as 'DUNCAN DECORATOR ACRYLIC OPAQUE DIMENSIONAL WRITER "CHRISTMAS GREEN" (C14), "DUNCAN DECORATOR ACRYLIC OPAQUE DIMENSIONAL WRITER ROYAL BLUE" (C15), "TULIP SLICK FABRIC PAINT BLUE" (C18), "ELMER'S GLU-COLOR ORANGE" (C16) AND "ELMER'S GLU-COLOR FLUORESCENT YELLOW" (C17)'. "The latex color dispersions were mixed with each of the premixes in ratios shown in table 5. The final mixes were carefully hand agitated for at least 15 minutes and subsequently filled in seperate squeeze bottles.

The compositions FOR017, FOR018 and FOR020 were used to draw various arts on T-Shirts and compared with the original compositions C14, C15 and C18 respectively. The original fabric paint resins C14, C15 and C18 were formulated to place dots on the T-shirts. These colors by themselves showed no tendency to form strings. Using these colors, a line element was difficult to make. In order to make a line, the bottle would have to be squeezed contimuously to dispense uninterupted supply of the colorants. The straightness of the line depended heavily on the skills of the artist. In contrast, forming straight lines was extremely easy using compositions FOR017, FOR018 and FOR020. These pituitous compositions were dispensed at various points on a T-shirt surface and string element means were pulled away from the visible scene and maneuvered into drawing a variety of lines and shapes. The process was repeated to effect various designs on the T-shirt. These compositions were dried for 24 hours, the same time as recommended by the manufacturers to dry the original C14, C15 and C18 resins. Normal washing cycle did not affect the permanent adherence of the hardened pituitous compositions to the fabric surface.

The original compositions of polyvinyl acetate glues C16 and C17 were compared with the modified compositions FOR0022 and FOR0025 respectively. The original compositions C16 and C17 showed slight pituitous characteristic which appeared to be incidental. However, the pituity of the compositions was not sufficient to form string element means. The glue compositions were formulated to dispense discreet amounts to one spot on the visible scene. However, drawing straight line elements using these compositions required squeezing the bottles continuously and depended heavily on the skills of the users. In contrast, the compositions FOR0022 and FOR0025 displayed remarkable capability to form string element means and to draw straight lines on paper surface with a glossy finish (Lebelon Plotter paper with super smooth coating) by using the PULL vector techniques. These compositions were dried for 3 hours, leaving thick and embossed markings on the substrate.

TABLE 5

Compositions involving art & craft grade latex paints and coatings

| FORMULATION I.D | P1 | P3 | C14 | C15 | C16 | C17 | C18 |
|---|---|---|---|---|---|---|---|
| FOR0017 | | 36.5 | 56 | | | | |
| FOR0018 | | 40 | | 58 | | | |
| FOR0020 | | 40 | | | | | 57 |
| FOR0022 | | 40 | | | | 55 | |
| FOR0025 | | 40 | | | 62 | | |

The foregoing description should not be read as pertaining only to the precise structures techniques described but rather should be read consistent with, and as support for, the following claims, which are to have their fullest fair scope.

What I claim is:

1. A marking device with one or more reservoir assemblies containing one or more pituitous color compositions, connected to one or more dispensing means with one or more orifices such that said one or more pituitous color compositions can be dispensed from said one or more dispensing means in a manner that the dispensed one or more pituitous color compositions can be stretched in one or more strings or films forms.

2. A marking device containing one or more pituitous color compositions and having one or more applicator assemblies with one or more orifices such that said one or more pituitous color compositions can be dispensed from said one or more applicator assemblies on a visible scene in a manner that said one or more applicator assemblies make one or more visible impressions on said visible scene by pressing the one or more pituitous color compositions against the visible scene, and by trapping at least partially the one or more pituitous color compositions between the one or more applicator assemblies and the visible scene.

3. A marking device according to claim 2 wherein said one or more applicator assemblies are such that said one or more pituitous color compositions trapped between the one or more applicator assemblies and a visible scene are stretched in one or more string or film forms as the one or more applicator assemblies are pulled away from said visible scene.

4. A marking device according to claim 2 wherein shape of said one or more applicator assemblies are such that said one or more visible impressions on said visible scene can vary in shapes and sizes.

5. A squeeze bottle dispensing device with singularity or plurality of holder bodies containing one or more pituitous compositions, and connected to one or more dispensing means with one or more dispensing tips and one or more discharge orifices, in a manner that said one or more pituitous compositions are dispensed as at least one of said singularity or plurality of holder bodies is squeezed.

6. A squeeze bottle dispensing device in claim 5 wherein said one or more pituitous compositions are dispensed from said one or more dispensing tips and the one or more dispensing tips are shaped in a manner that a) one or more visible impressions on a visible scene are of variety of shapes and sizes as the one or more dispensing tips are pressed against said visible scene, and b) the one or more pituitous compositions trapped in between the one or more dispensing tips and the visible scene can be stretched in one or more string or film forms, and c) said one or more of strings or film forms of one or more pituitous compositions mark a substrate on contact.

7. A squeeze bottle marking device in claim 5 with one or more solid stylus assemblies to control the amount and flow of said one or more pituitous compositions from said one or more discharge orifices in a manner such that a) said one or more solid stylus assemblies are movably secured into the one or more discharge orifices in such a manner that writing pressure enables the one or more solid stylus assemblies to move backwards against the resilient force of a seat to form an ink-feed space while pressing one or more tips of the one or more solid stylus assemblies against a visible scene, thereby, causing the one or more pituitous compositions to pass through said ink-feed space and onto said visible scene, and b) once the desired amount of the one or more pituitous compositions is dispensed on the visible scene the one or more solid stylus assemblies are pulled away from the visible scene thereby closing the ink feed space thus preventing discharge of the one or more pituitous compositions.

8. A squeeze bottle marking device in claim 5 wherein one or more said dispensing tips are of one or more shapes and sizes to make impressions on the visible scene.

* * * * *